US010603746B2

(12) United States Patent
Ienari et al.

(10) Patent No.: US 10,603,746 B2
(45) Date of Patent: Mar. 31, 2020

(54) LASER-WELDED SHAPED STEEL AND METHOD FOR PRODUCING SAME

(71) Applicant: NISSHIN STEEL CO., LTD., Tokyo (JP)

(72) Inventors: Toru Ienari, Tokyo (JP); Yasuhiro Sakurada, Tokyo (JP); Hiroshi Asada, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

(21) Appl. No.: 16/077,264

(22) PCT Filed: Sep. 9, 2016

(86) PCT No.: PCT/JP2016/076650
§ 371 (c)(1),
(2) Date: Aug. 10, 2018

(87) PCT Pub. No.: WO2017/141470
PCT Pub. Date: Aug. 24, 2017

(65) Prior Publication Data
US 2019/0084086 A1 Mar. 21, 2019

(30) Foreign Application Priority Data

Feb. 16, 2016 (JP) .................. 2016-027285
Apr. 27, 2016 (JP) .................. 2016-089403

(51) Int. Cl.
| | | |
|---|---|---|
| C22C 38/00 | (2006.01) | |
| E04B 1/24 | (2006.01) | |
| E04C 3/06 | (2006.01) | |
| F16B 5/10 | (2006.01) | |
| B23K 26/242 | (2014.01) | |

(Continued)

(52) U.S. Cl.
CPC ............ B23K 26/242 (2015.10); C22C 38/00 (2013.01); E04B 1/24 (2013.01); E04C 3/06 (2013.01);
(Continued)

(58) Field of Classification Search
None
See application file for complete search history.

(56) References Cited

U.S. PATENT DOCUMENTS

2004/0158984 A1 8/2004 Lundgren
2013/0078031 A1 3/2013 Nakamura et al.
(Continued)

FOREIGN PATENT DOCUMENTS

CN 102753300 A 10/2012
CN 104520056 A 4/2015
(Continued)

OTHER PUBLICATIONS

Solokov et al., "Laser welding and weld hardness analysis of thick section S355 structural steel", Dec. 2011, Materials and Design, vol. 32, pp. 5127-5131. (Year: 2011).*
(Continued)

*Primary Examiner* — Humera N Sheikh
*Assistant Examiner* — Xiaobei Wang
(74) *Attorney, Agent, or Firm* — Mintz Levin Cohn Ferris Glovsky and Popeo, P.C.; David G. Conlin; Steven M. Jensen

(57) ABSTRACT

A laser-welded shape section steel includes a web member and a flange member each made of a steel plate, the steel plate having an equivalent carbon content $C_{eql}$ of not less than 0.075 and not more than 0.15, the equivalent carbon content $C_{eql}$ being represented by the following formula: $C_{eql}=C+(Si/50)+(Mn/25)+(P/2)+(Cr/25)+Ti$, where a welded part, which is a joint part in which the web member and the flange member are joined, has a hardness of not less than 1.2 times and not more than 4 times as hard as that of the steel plate, and the welded part a protrusion length of not greater than 1 mm.

3 Claims, 10 Drawing Sheets

(51) Int. Cl.
*F16B 5/08* (2006.01)
*B23K 101/28* (2006.01)
*B23K 103/04* (2006.01)
*E04C 3/04* (2006.01)

(52) U.S. Cl.
CPC ............ *F16B 5/08* (2013.01); *B23K 2101/28* (2018.08); *B23K 2103/04* (2018.08); *E04C 2003/0413* (2013.01); *E04C 2003/0452* (2013.01)

(56) References Cited

U.S. PATENT DOCUMENTS

| | | |
|---|---|---|
| 2014/0186650 A1 | 7/2014 | Wunsch |
| 2015/0273630 A1 | 10/2015 | Sakurada et al. |
| 2016/0074923 A1 | 3/2016 | Wunsch |

FOREIGN PATENT DOCUMENTS

| | | |
|---|---|---|
| EA | 201391631 A1 | 2/2014 |
| JP | 08-276286 A | 10/1996 |
| JP | 2002-003984 A | 1/2002 |
| JP | 2002-371338 A | 12/2002 |
| JP | 2003-080385 A | 3/2003 |
| JP | 2009-119485 A | 6/2009 |
| JP | 2011-083781 A | 4/2011 |
| JP | 2012-152820 A | 8/2012 |
| RU | 2287418 C2 | 11/2006 |

OTHER PUBLICATIONS

Office Action (Notification of Reasons for Refusal) dated Jun. 13, 2017 in Japanese Application No. 2016-558421.
Office Action (Notification of Reasons for Refusal) dated Dec. 6, 2016 in Japanese Application No. 2016-558421.
International Search Report for PCT Application No. PCT/JP2016/076650 dated Nov. 8, 2016.
English-language translation of International Preliminary Report on Patentability for PCT Application No. PCT/JP2016/076650 dated Aug. 30, 2018.
Office Action (Decision of Refusal) dated Jan. 17, 2017 in corresponding Japanese Patent Application No. 2016-558421.

* cited by examiner

LASER-WELDED SHAPED STEEL AND METHOD FOR PRODUCING SAME

TECHNICAL FIELD

The present invention relates to a section shape steel. More specifically, the present invention relates to a section shape steel whose welded part is formed by carrying out laser welding.

BACKGROUND ART

Conventionally, an H-section shape steel having an H-shaped cross section has been widely used as a structural member for a building or the like. As illustrated in FIG. 6, known examples of such an H-section shape steel includes (i) a lightweight welded H-section shape steel prepared by joining a web member to flange members by carrying out high-frequency welding (see (a) of FIG. 6), (ii) a build H-section shape steel prepared by joining a web member to flange members by carrying out arc welding (see (b) of FIG. 6), and (iii) a rolled H-section shape steel prepared by subjecting a bloom or the like to hot rolling (see (c) of FIG. 6).

As illustrated in (a) of FIG. 6, the lightweight welded H-section shape steel has a bead because, during high-frequency welding, the web member is abutted against the flange members and thereby molten steel is extruded. Moreover, the lightweight welded H-section shape steel has a notch formed between a surface of a steel plate and the bead. It follows that stress may be concentrated at the notch and a breakage may occur from the notch, in a case where the lightweight welded H-section shape steel receives a load. Meanwhile, as illustrated in (b) of FIG. 6, the build H-section shape steel has a welding bead due to a filler wire, which is used during arc welding. Furthermore, as illustrated in (c) of FIG. 6, the rolled H-section shape steel has a curved surface part (which is called a fillet) formed at an intersection between a web and a flange.

In a case where an H-section shape steel is used as a structural member, (i) a reinforcement member may be arranged between flange members so as to abut on a web member and/or (ii) the H-section shape steel may be used by being joined to another member. In such a case, a protrusion (such as the bead, the welding bead, or the fillet discussed above) may impede (i) the arrangement of the reinforcement member and/or (ii) the joint of the H-section shape steel and another member. Moreover, if such a protrusion is removed by, for example, cutting, there arises a problem of decrease in strength.

In order to solve the above problem, there has been proposed a method of producing a section shape steel in which method a web member is joined to flange members by carrying out laser welding (see, for example, Patent Literatures 1 through 3). In such a method of producing a section shape steel by carrying out laser welding, no filler wire is used during welding, and therefore no protrusion is formed on a welded part. As such, (i) the arrangement of a reinforcement member and/or (ii) the joint of the section shape steel and another member is/are never impeded by a protrusion.

CITATION LIST

Patent Literature

[Patent Literature 1]
Japanese Patent Application Publication Tokukai No. 2009-119485 (Publication date: Jun. 4, 2009)
[Patent Literature 2]
Japanese Patent Application Publication Tokukai No. 2011-83781 (Publication date: Apr. 28, 2011)
[Patent Literature 3]
Japanese Patent Application Publication Tokukai No. 2012-152820 (Publication date: Aug. 16, 2012)

SUMMARY OF INVENTION

Technical Problem

Recent years have seen a demand for a laser-welded section shape steel, prepared by carrying out laser welding, whose welded part is improved in strength.

The present invention was made in view of the above problem, and an object of the present invention is to provide a laser-welded section shape steel whose welded part is excellent in strength.

Solution to Problem

In order to attain the above object, a laser-welded shape section steel in accordance with an embodiment of the present invention includes: a web member and a flange member each made of a steel plate, the steel plate having an equivalent carbon content Ceql of not less than 0.075 and not more than 0.15, the equivalent carbon content Ceql being represented by following Formula (1):

$$C_{eql} = C + \frac{Si}{50} + \frac{Mn}{25} + \frac{P}{2} + \frac{Cr}{25} + Ti \qquad (1)$$

a welded part, which is a joint part in which the web member and the flange member are joined, having a hardness of not less than 1.2 times and not more than 4 times as hard as that of the steel plate, the welded part having a protrusion length of not greater than 1 mm.

A method of producing a laser-welded shape section steel in accordance with an embodiment of the present invention is a method of producing a laser-welded shape section steel including a web member and a flange member each made of a steel plate, the method including the step of: joining the web member to the flange member by carrying out laser welding, the steel plate having an equivalent carbon content Ceql of not less than 0.075 and not more than 0.15, the equivalent carbon content Ceql being represented by following Formula (1):

$$C_{eql} = C + \frac{Si}{50} + \frac{Mn}{25} + \frac{P}{2} + \frac{Cr}{25} + Ti \qquad (1)$$

a welded part, which is a joint part in which the web member and the flange member are joined, having a hardness of not less than 1.2 times and not more than 4 times as hard as that the steel plate, and the welded part having a protrusion length of not greater than 1 mm.

Advantageous Effects of Invention

According to an embodiment of the present invention, a welded part has a protrusion length of not greater than 1 mm. This causes an increase in freedom of the arrangement of a reinforcement member, in a case where a reinforcement member or the like is arranged in a region which is defined by a flange member and a web member. This brings about an advantage in terms of design and construction in a case where the laser-welded section shape steel is used as a structural member for a building or the like. The equivalent carbon content $C_{eql}$ of the welded part is thus not less than 0.075 and not more than 0.15 and the hardness of the welded part is thus not less than 1.2 times and not more than 4 times as hard as that of the base material. This allows the laser-welded section shape steel to have a welded part which is excellent in strength, despite of the welded part having a protrusion length of not greater than 1 mm.

BRIEF DESCRIPTION OF DRAWINGS (a) of FIG. 1 is a view illustrating a cross section of a laser-welded shape section steel in accordance with Embodiment 1 of the present invention, which cross section is perpendicular to a longitudinal direction of the laser-welded section shape steel. (b) of FIG. 1 is a partially enlarged view taken in (a) of FIG. 1.

Figure 5:
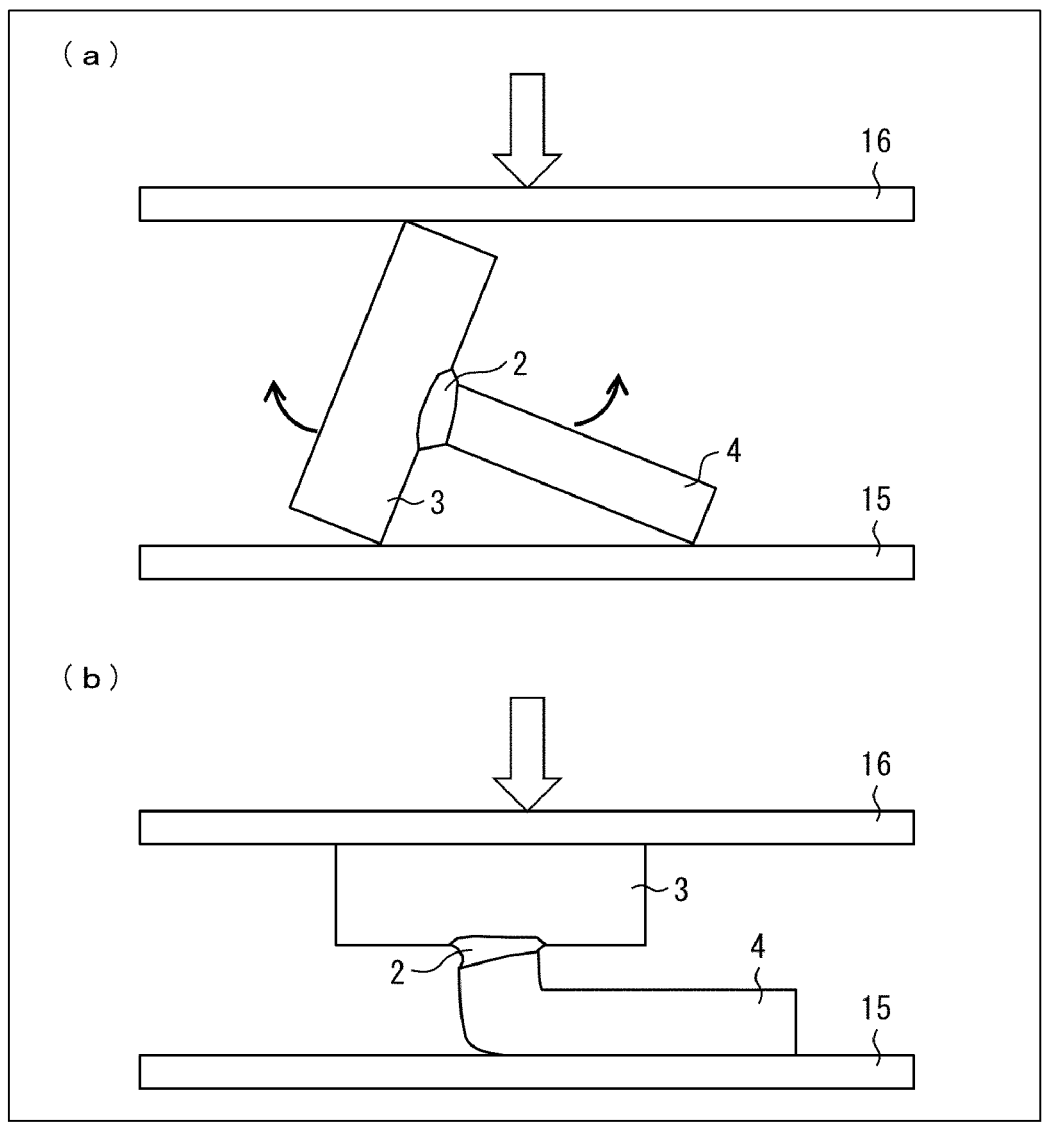

(a) and (b) of FIG. 5 are each a view schematically illustrating a diagonal cracking test.

Figure 6:
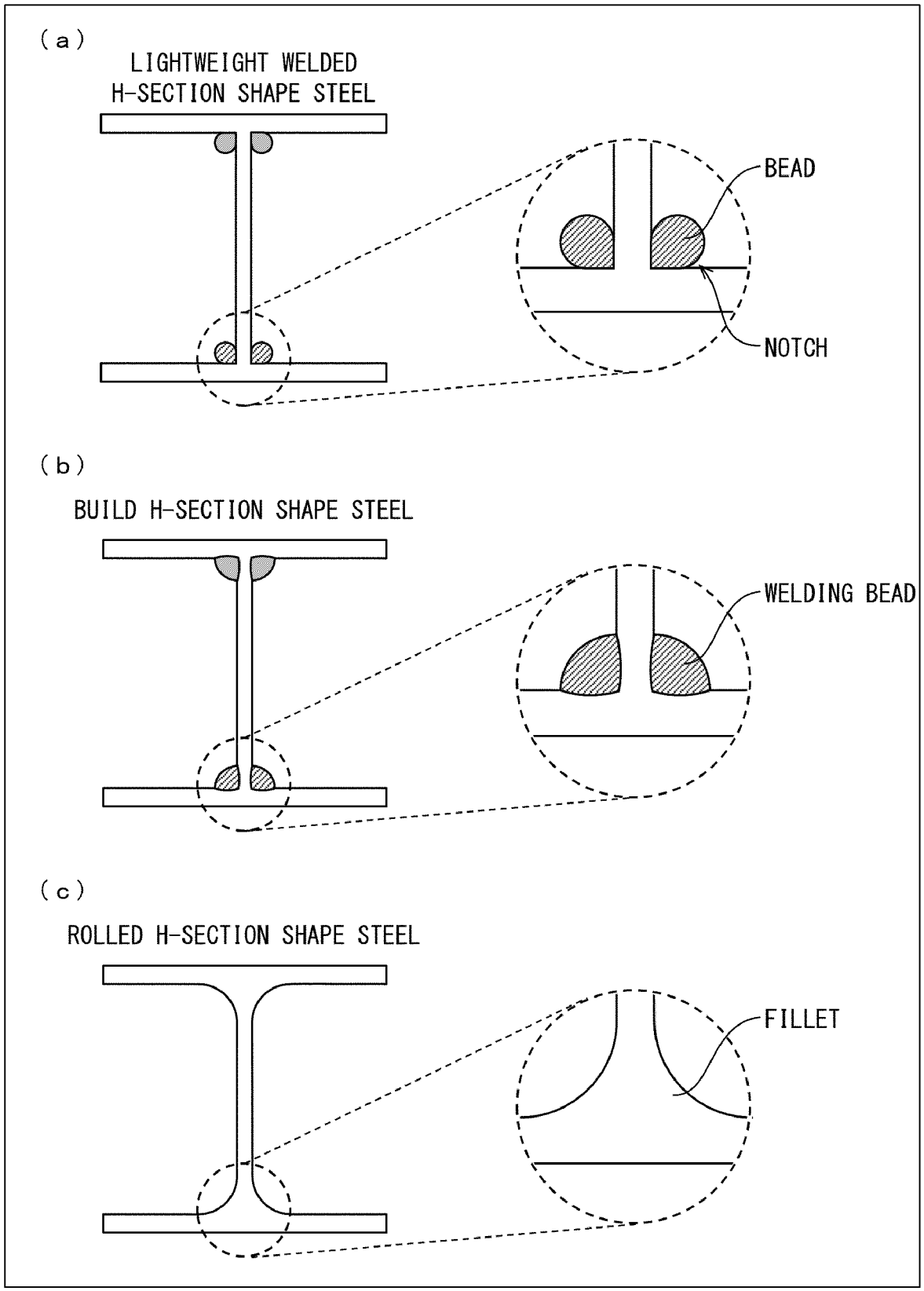

(a) through (c) of FIG. 6 are each a view illustrating a conventional H-section shape steel.

Figure 7:
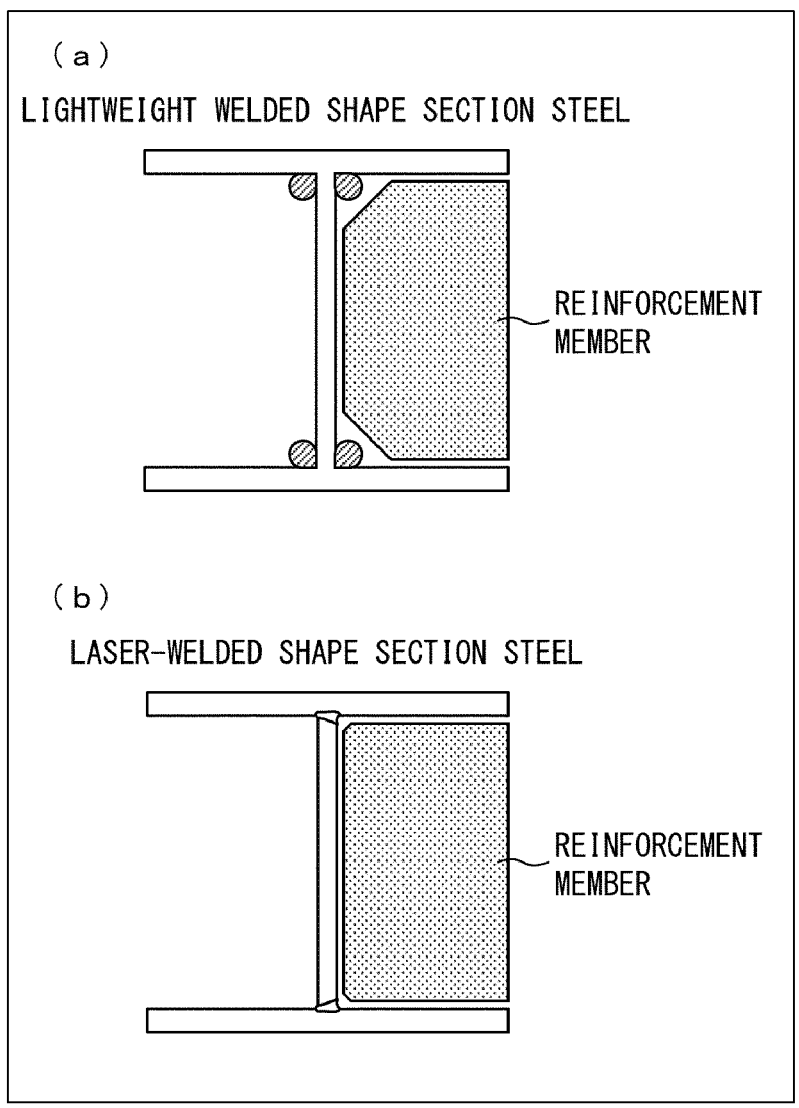

FIG. 7 is a view illustrating examples in which a section shape steel is employed as a structural member for a building or the like.

Figure 8:
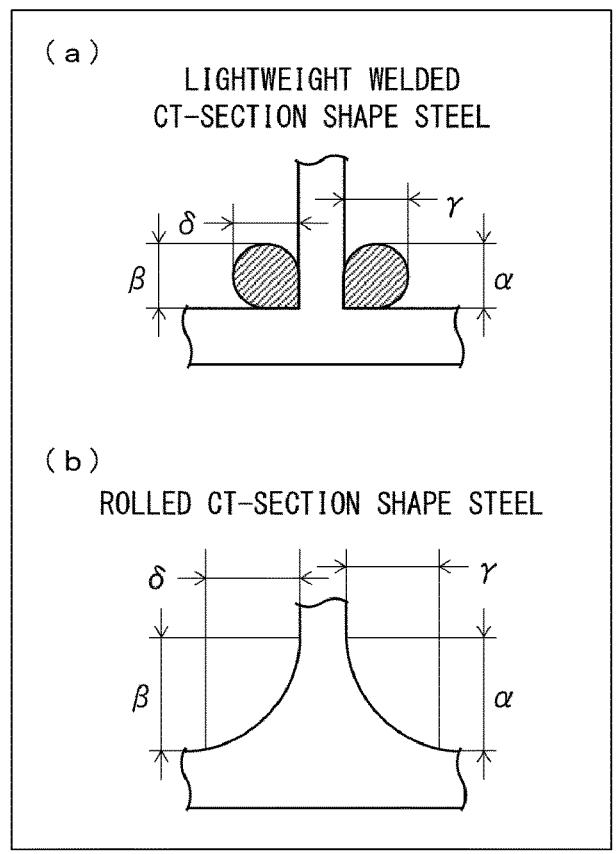

(a) and (b) of FIG. 8 are views illustrating respective protrusion lengths in a lightweight welded CT-section shape steel and a rolled CT-section shape steel.

Figure 9:
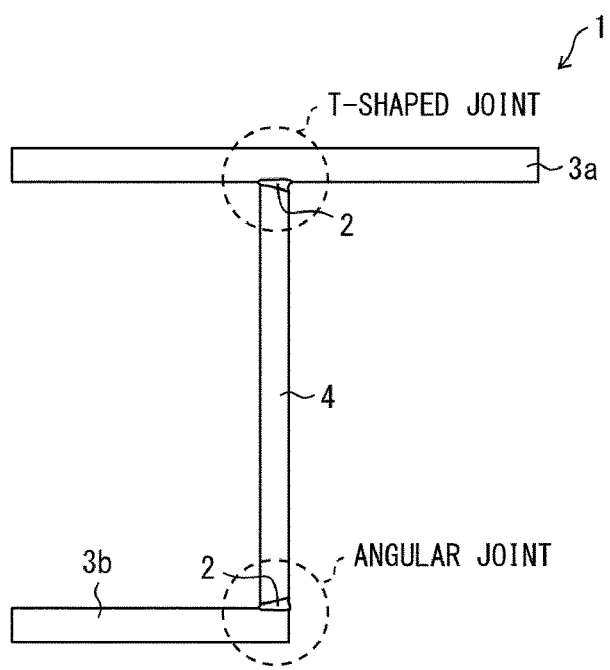

FIG. 9 is a view illustrating a cross section of a laser-welded section shape steel in accordance with Embodiment 2 of the present invention, which cross section is perpendicular to a longitudinal direction of the laser-welded section shape steel.

Figure 10:
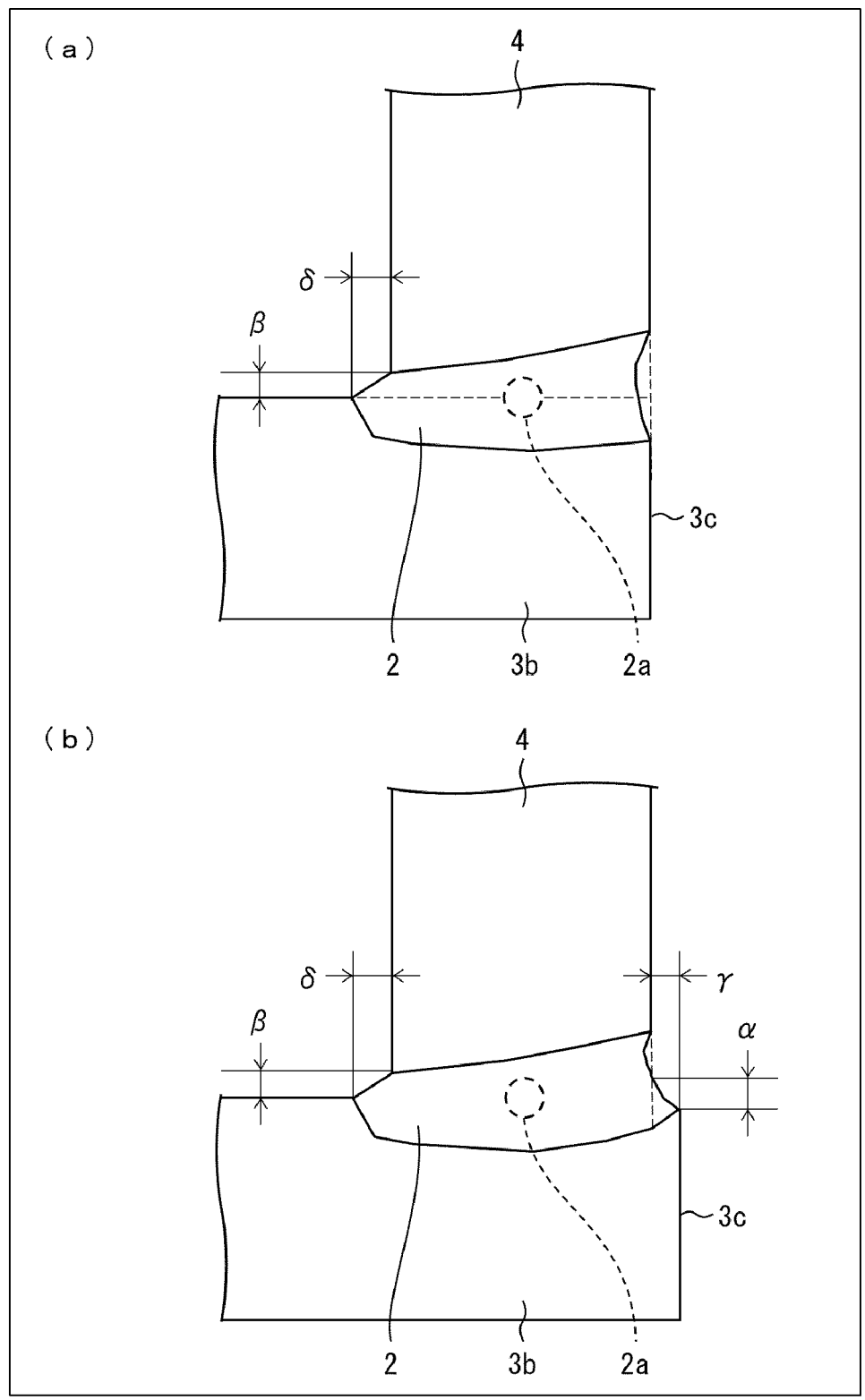

FIG. 10 is a partially enlarged view of an angular joint of the laser-welded section shape steel in accordance with Embodiment 2. (a) of FIG. 10 illustrates a case where an end face of a flange member is coplanar with a front face of a web member. (b) of FIG. 10 illustrates a case where the end face of the flange member protrudes with respect to the plane of the web member.

Figure 11:
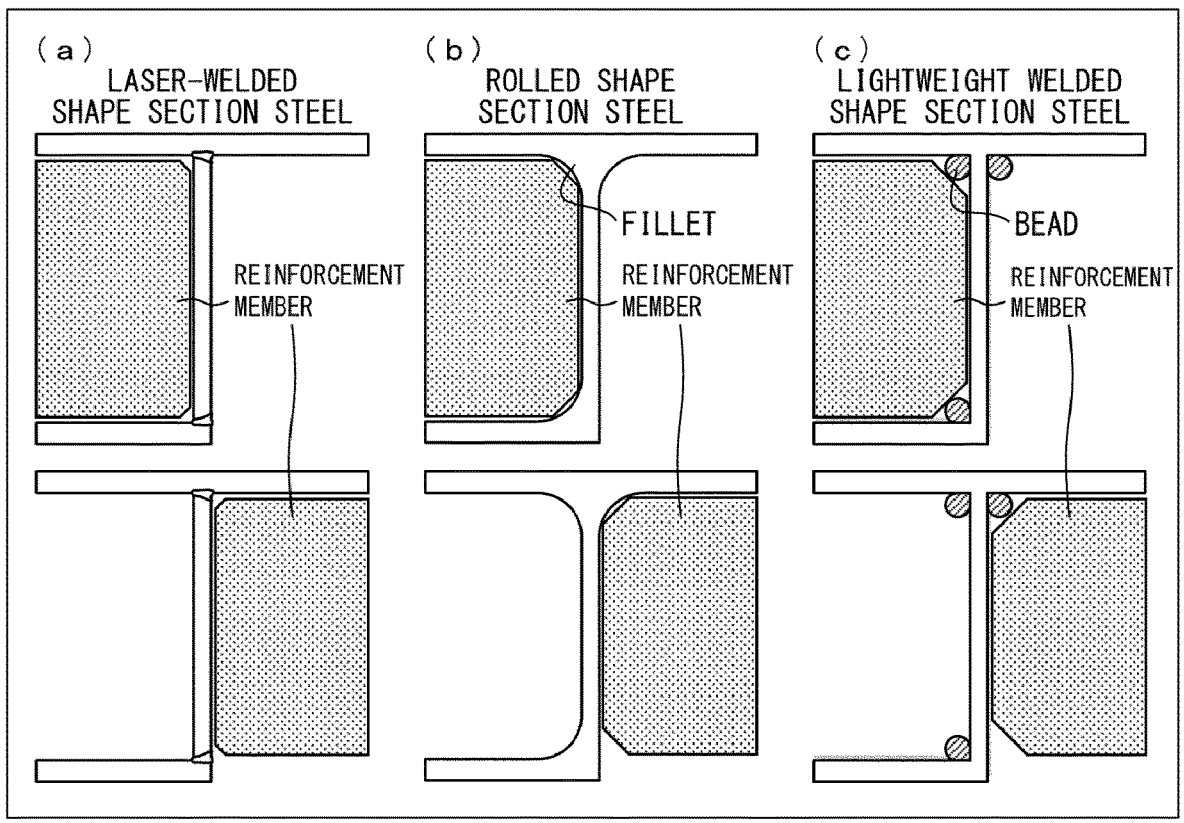

FIG. 11 is a view illustrating examples in which a section shape steel is employed as a structural member for a building or the like. (a) of FIG. 11 illustrates the laser-welded section shape steel in accordance with Embodiment 2. (b) of FIG. 11 illustrates a rolled section shape steel. (c) of FIG. 11 illustrates a lightweight welded section shape steel.

Figure 12:
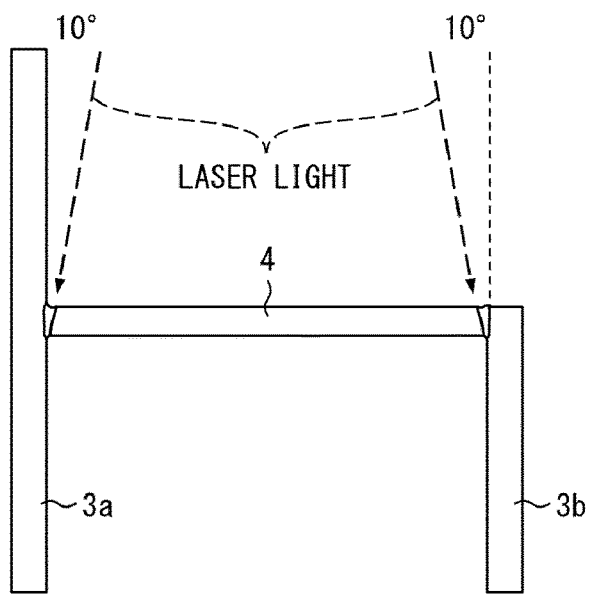

FIG. 12 is a view schematically illustrating how laser welding was carried out in Example 2 of the present invention.

Figure 13:
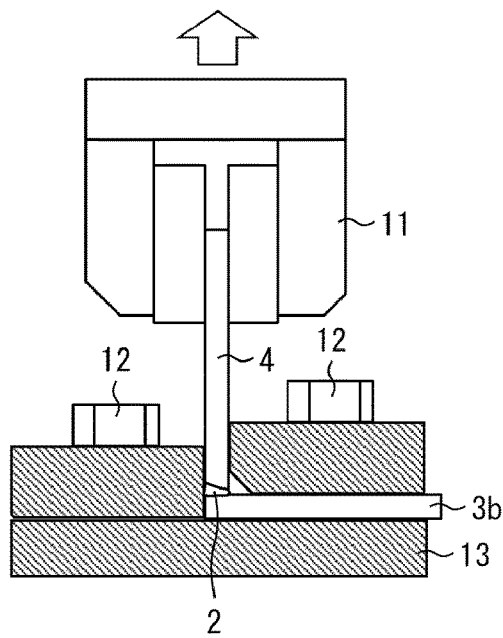

FIG. 13 is a view schematically illustrating a fatigue test in Example 2.

Figure 14:
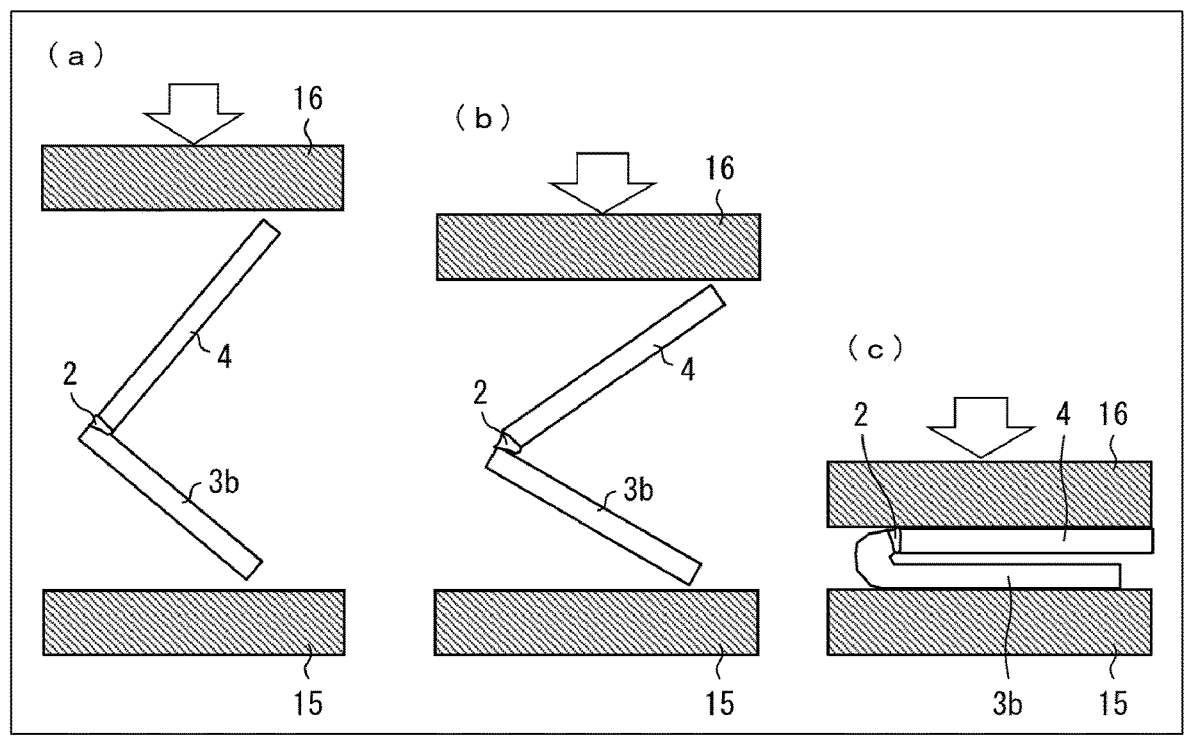

(a) through (c) of FIG. 14 are each a view schematically illustrating an adhesion bending test in Example 2.

DESCRIPTION OF EMBODIMENTS

The following description will discuss Embodiments of the present invention with reference to the drawings.

Embodiment 1

Figure 1:
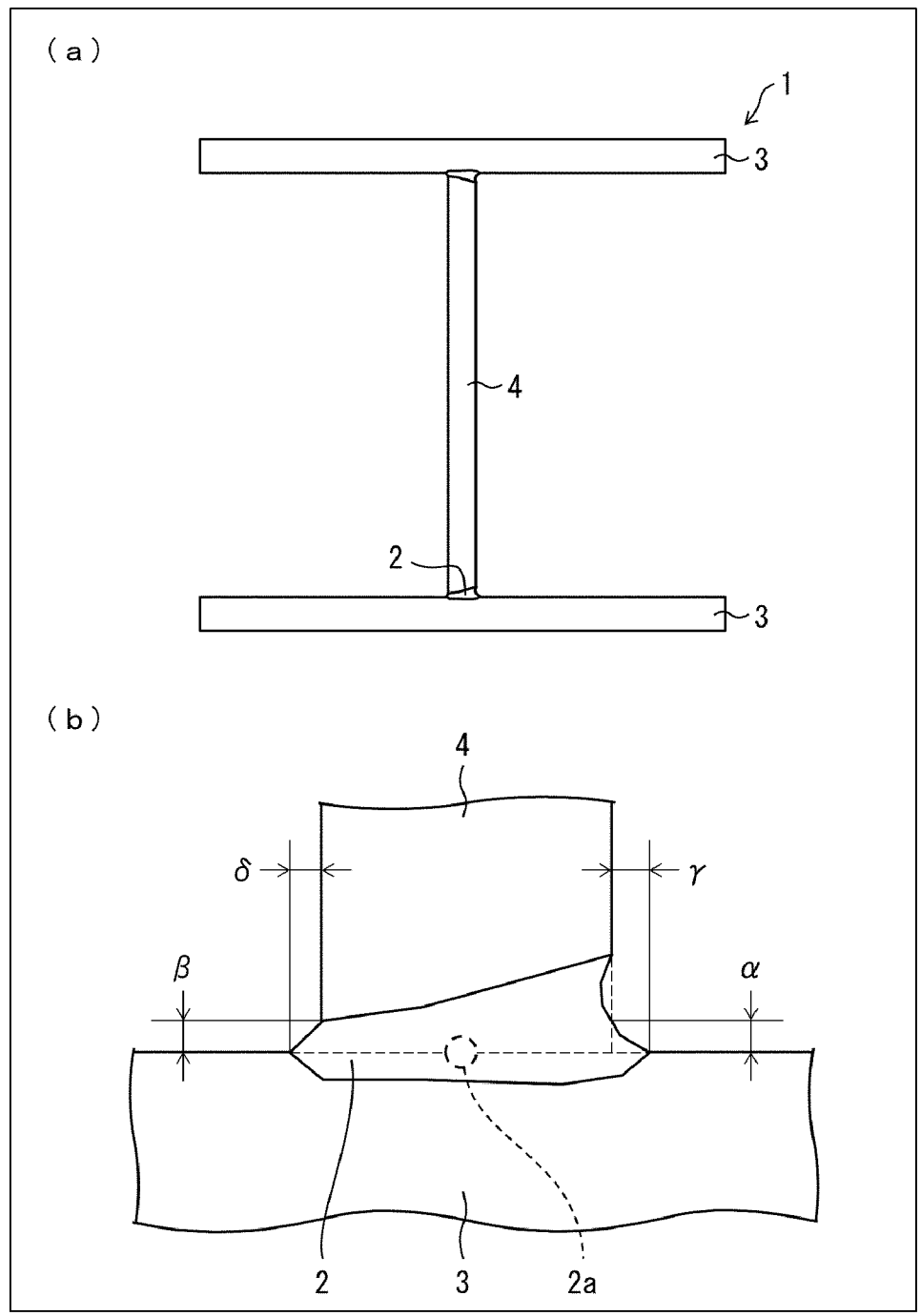

(a) of FIG. 1 is a view illustrating a cross section of a laser-welded section shape steel 1 in accordance with Embodiment 1, which cross section is perpendicular to a longitudinal direction of the laser-welded section shape steel 1. (b) of FIG. 1 is a partially enlarged view of a welded part 2 of the laser-welded section shape steel 1 illustrated in (a) of FIG. 1.

The laser-welded section shape steel 1 is an H-section shape steel, which is prepared by carrying out laser welding so that two flange members 3 are joined via a web member 4. The flange members 3 and the web member 4 are each made of a steel plate. Note that Embodiment 1 discusses a configuration in which the laser-welded section shape steel 1 is an H-section shape steel whose cross section perpendicular to the longitudinal direction is H-shaped. Embodiment 1 is, however, not limited as such. That is, the laser-welded section shape steel 1 is not particularly limited, provided that a section shape steel has a T-shaped joint which is prepared by carrying out laser welding. Alternatively, the laser-welded section shape steel 1 can be all kinds of section shape steels such as an I-section shape steel and a T-section shape steel. Note that, hereinafter, the flange members 3 and the web member 4 will sometimes be collectively referred to as a base material.

The laser-welded section shape steel 1 has welded parts 2 in joint parts in which (i) the respective flange members 3 and (ii) the web member 4 are joined. The welded parts 2 are formed by melting the flange members 3 and the web member 4.

According to the laser-welded section shape steel 1 in accordance with Embodiment 1, the welded parts 2 each have a protrusion length of not greater than 1 mm, and preferably not greater than 0.75 mm. Such a protrusion length refers to the greatest one of (i) lengths by which the welded parts 2 protrude, from the respective flange members 3, in a given cross section of the laser-welded section shape steel 1, the given cross section being perpendicular to the longitudinal direction of the laser-welded section shape steel 1, and (ii) lengths by which the welded parts 2 protrude, from the web member 4, in the given cross section.

Assume here that a side of the web member 4, which side has been irradiated with laser light, is referred to as a front side. Under such an assumption, the protrusion length of the welded part 2 illustrated in (b) of FIG. 1 refers to the greatest one of (i) a length α by which the welded part 2 protrudes from the flange member 3 on the front side of the web member 4, (ii) a length β by which the welded part 2 protrudes from the flange member 3 on a back side of the web member 4, (iii) a length γ by which the welded part 2 protrudes from the front side of the web member 4, and (iv) a length δ by which the welded part 2 protrudes from the back side of the web member 4. According to the laser-welded section shape steel 1 in accordance with Embodiment 1, the lengths, represented by α, β, γ, and δ, by which the welded part protrudes in a given cross section are each not greater than 1 mm.

The web member 4 has a thickness of preferably not greater than 6 mm. This is because, in a case where the thickness of the web member 4 exceeds 6 mm, an amount of input heat needs to be increased while the web member 4 is being welded to the flange members 3 by carrying out laser welding. This may ultimately cause the protrusion length of the welded part 2 (particularly, lengths of back beads represented by respective β and δ in (b) of FIG. 1) to exceed 1 mm. Note that a thickness of the flange member 3 is not limited to a particular one.

FIG. 7 is a view illustrating examples in which a section shape steel is employed as a structural member for a building or the like. (a) of FIG. 7 illustrates a lightweight welded section shape steel. (b) of FIG. 7 illustrates the laser-welded section shape steel 1 in accordance with Embodiment 1.

According to a conventional section shape steel such as a lightweight welded section shape steel, a protrusion is formed in a joint part in which a web member and a flange member are joined (see (a) of FIG. 7). In a case where such a section shape steel is employed as a structural member for a building or the like, a reinforcement member is sometimes arranged in a region which is defined by a web member and a flange member. In such an arrangement, according to a conventional section shape steel such as a lightweight welded section shape steel, a protrusion is formed in a joint part in which a web member and a flange member are joined. This gives rise to the limitation(s) of (i) an arrangement of the reinforcement member and/or (ii) a shape of the reinforcement member.

In contrast, according to the laser-welded section shape steel 1 in accordance with Embodiment 1, the protrusion length of the welded part 2 is not greater than 1 mm (see (b) of FIG. 7). This causes an increase in freedom of (i) the arrangement of the reinforcement member and/or (ii) the shape of the reinforcement member. Note that such a section shape steel is sometimes used while being joined to another member. Even in such a case, the welded part 2 will never impede the joint of the section shape steel and another member. This is because the protrusion length of the welded part 2 is not greater than 1 mm. As such, in a case where the laser-welded section shape steel 1 is employed as a structural member, the laser-welded section shape steel 1 in accordance with Embodiment 1 is more advantageous in terms of design and construction than a conventional section shape steel.

According to the laser-welded section shape steel 1 in accordance with Embodiment 1, the welded part 2 has a hardness of not less than 1.2 times and not more than 4 times as hard as that of the base material, which is composed of the web member 4 and the flange members 3. The hardness of the welded part 2 is preferably not less than 2 times and not more than 3.5 times as hard as that of the base material. Note that the hardness as used herein refers to Vickers hardness (Hv0.2). The hardness of the welded part 2 refers to the hardness measured in (i) an abutting part (contact part) of the welded part 2 in which abutting part the web member 4 is abutted against the flange member 3 and (ii) a location corresponding to a center, in a thickness direction, of the web member 4. The hardness of the welded part 2 refers to, for example, the hardness as measured in a location 2a (see (b) of FIG. 1). Note that an average of the hardness of the web member 4 and the hardness of the flange members 3 is regarded as the hardness of the base material, in a case where the web member 4 differs in hardness from the flange members 3.

Note that, according to the laser-welded section shape steel 1, a hardness ratio represented by (hardness of welded part 2)/(hardness of base material) is controllable based on, for example, a composition of the base material and a condition of laser welding.

Furthermore, according to the laser-welded section shape steel 1 in accordance with Embodiment 1, the welded part 2 has an equivalent carbon content $C_{eql}$ of not less than 0.075 and not more than 0.15, the equivalent carbon content $C_{eql}$ being represented by Formula (1) below. Note that each symbol of element in following Formula (1) represents a weight percent concentration of a corresponding element contained in the welded part 2.

$$C_{eql} = C + \frac{Si}{50} + \frac{Mn}{25} + \frac{P}{2} + \frac{Cr}{25} + Ti \qquad (1)$$

Note that the equivalent carbon content $C_{eql}$ of the welded part 2 can be obtained by directly measuring a concentration of each element contained in the welded part 2. Alternatively, the equivalent carbon content $C_{eql}$ of the welded part 2 can be obtained based on a weight percent concentration of each element contained in the web member 4 and the flange members 3. The reason for this is that, since the laser welding uses no filler wire during laser welding unlike the arc welding, the welded part 2 is identical in composition to each of the web member 4 and the flange members 3. Note that, in a case where the web member 4 and the flange members 3 employ respective steel plates whose compositions are different from each other, an average of the respective compositions of the web member 4 and the flange members 3 can be employed as the composition of the welded part 2.

Figure 2:
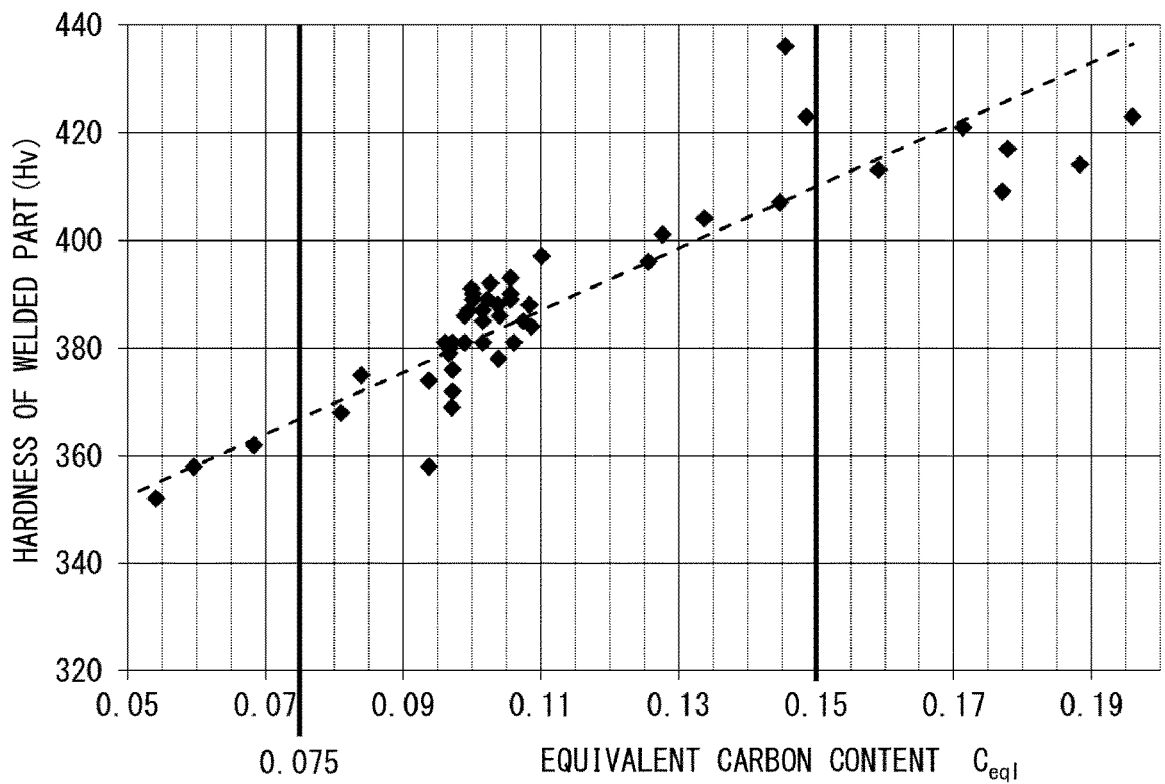
FIG. 2 is a view illustrating a relationship between an equivalent carbon content $C_{eql}$ and a hardness of a welded part.

FIG. 2 is a view illustrating a relationship between (a) the equivalent carbon content $C_{eql}$ represented by Formula (1) and (b) the hardness of the welded part 2. The equivalent carbon content $C_{eql}$ represented by Formula (1) was found out, as a result of their diligent studies, by the inventors of the present invention. As is clear from FIG. 2, there exists a good correlation between the equivalent carbon content $C_{eql}$ and the hardness of the welded part 2.

Note that each of the steel plates (the flange members 3 and the web member 4) used in the laser-welded section shape steel 1 in accordance with Embodiment 1 can be (i) a steel plate treated by thermal refining (such as quenching and/or tempering) or (ii) a micro alloying steel plate which is not subjected to thermal refining.

As has been discussed, the laser-welded section shape steel 1 in accordance with Embodiment 1 is configured such that (a) the equivalent carbon content $C_{eql}$ represented by Formula (1) is not less than 0.075 and not more than 0.15, (b) the welded part 2 has a protrusion length of not greater than 1 mm, and (c) the welded part 2 has a hardness of not less than 1.2 times and not more than 4 times as hard as that of the base material. With the configuration, the laser-welded section shape steel 1 in accordance with Embodiment 1 brings about the following effects (i) and (ii).

(i) The welded part 2 thus has a protrusion length of not greater than 1 mm. This causes an increase in freedom of the arrangement of a reinforcement member in a case where a reinforcement member or the like is arranged in a region which is defined by the flange members 3 and the web member 4. This brings about an advantage in terms of design and construction in a case where the laser-welded section shape steel 1 is used as a structural member for a building or the like.

(ii) The equivalent carbon content $C_{eql}$ of the welded part 2 is thus not less than 0.075 and not more than 0.15 and the hardness of the welded part 2 is thus not less than 1.2 times and not more than 4 times as hard as that of the base material. This allows the laser-welded section shape steel 1 to have a welded part 2 which is excellent in strength, despite of the welded part 2 having a protrusion length of not greater than 1 mm.

Embodiment 2

Embodiment 1 has discussed the laser-welded section shape steel having a T-shaped joint which is prepared by carrying out laser welding. The present invention is, however, not limited to such a laser-welded section shape steel having a T-shaped joint. The present invention can also be applied to, for example, a laser-welded section shape steel having an angular joint.

FIG. 9 is a view illustrating a cross section of a laser-welded section shape steel 1 in accordance with Embodiment 2, which cross section is perpendicular to a longitudinal direction of the laser-welded section shape steel 1. As illustrated in FIG. 9, the laser-welded section shape steel 1 is a section shape steel, which is prepared by carrying out laser welding so that two flange members 3a and 3b are joined via a web member 4. The two flange members 3a and 3b and the web member 4 are each made of a steel plate. The laser-welded section shape steel 1 has a J-shaped cross section and is configured such that (i) the flange member 3a and the web member 4 are joined via a T-shaped joint and (ii) the flange member 3b and the web member 4 are joined via an angular joint. The laser-welded section shape steel 1 is, hereinafter, referred to as a J-section shape steel.

Note that Embodiment 2 discusses a configuration in which the laser-welded section shape steel 1 is a J-section shape steel, but Embodiment 2 is not limited as such. That is, the laser-welded section shape steel 1 can be any type of a section shape steel such as a section shape steel having a U-shaped cross section, provided that the laser-welded section shape steel 1 employs an angular joint prepared by carrying out laser welding.

The laser-welded section shape steel 1 has welded parts 2 in joint parts in which (i) the respective flange members 3a and 3b and (ii) the web member 4 are joined. The welded parts 2 are formed by melting the flange members 3 and the web member 4. As with Embodiment 1, the welded part 2 in accordance with Embodiment 2 has a protrusion length of preferably not greater than 1 mm, and preferably not greater than 0.75 mm. Note that the protrusion length of the welded part 2 in the T-shaped joint is as discussed in Embodiment 1, and therefore description thereof is omitted. As such, the following description will discuss the protrusion length of the welded part 2 in the angular joint.

FIG. 10 is a partially enlarged view of the welded part 2 in the angular joint. FIG. 12 illustrates how welding is carried out during preparing the laser-welded section shape steel 1 in accordance with Embodiment 2. According to the laser-welded section shape steel 1 in accordance with Embodiment 2, the T-shaped joint and the angular joint can be prepared by irradiating one side of the web member 4 with laser light (see FIG. 12). As with Embodiment 1, a side of the web member 4, which side has been irradiated with laser light, is referred to as a front side. In a case where an end face 3c of the flange member 3b is coplanar with a front face of the web member 4, the protrusion length of the welded part 2 refers to the greatest one of (i) a length β by which the welded part 2 protrudes from the flange member 3b on a back side of the web member 4 and (ii) a length δ by which the welded part 2 protrudes from the back side of the web member 4 (see (a) of FIG. 10). Meanwhile, in a case where the end face 3c of the flange member 3b protrudes with respect to the front face of the web member 4, the protrusion length of the welded part 2 refers to the greatest one of (i) a length α by which the welded part 2 protrudes from the flange member 3b on the front side of the web member 4, (ii) the length β by which the welded part 2 protrudes from the flange member 3b on the back side of the web member 4, (iii) a length γ by which the welded part 2 protrudes from the front side of the web member 4, and (iv) the length δ by which the welded part 2 protrudes from the back side of the web member 4 (see (b) of FIG. 10). According to the laser-welded section shape steel 1 in accordance with Embodiment 2, the lengths, represented by α, β, γ, and δ, by which the welded section protrudes in a given cross section of the angular joint are each not greater than 1 mm.

Note that, in view of an amount of input heat during laser welding, it is preferable that the web member 4 in accordance with Embodiment 2 has, as with Embodiment 1, a thickness of not greater than 6 mm.

FIG. 11 is a view illustrating examples in which a section shape steel is employed as a structural member for a building or the like. (a) of FIG. 11 illustrates the laser-welded section shape steel 1 in accordance with Embodiment 2. (b) of FIG. 11 illustrates a rolled section shape steel. (c) of FIG. 11 illustrates a lightweight welded section shape steel.

In the rolled section shape steel and the lightweight welded section shape steel, protrusions (e.g., beads or fillets like those illustrated in FIG. 6) are formed in areas where a web member and a flange member are joined (see (b) and (c) of FIG. 11). Because of this, in a case where a reinforcement member is arranged in an area defined by the web member and the flange member, an arrangement and/or a shape of the reinforcement member are/is confined by a protrusion formed in an area where the web member and the flange member are joined.

In contrast, according to the laser-welded section shape steel 1 in accordance with Embodiment 2, the protrusion length of the welded part 2 in each of the T-shaped joint and the angular joint is not greater than 1 mm (see (a) of FIG. 11). As with Embodiment 1, this causes an increase in freedom of (i) the arrangement of the reinforcement member and/or (ii) the shape of the reinforcement member.

According to the laser-welded section shape steel 1 in accordance with Embodiment 2, the welded part 2 in each of the T-shaped joint and the angular joint has, as with Embodiment 1, a hardness of not less than 1.2 times and not more than 4 times as hard as that of a base material, which is composed of the web member 4 and the flange members 3. The hardness of the welded part 2 is preferably not less than 2 times and not more than 3.5 times as hard as that of the base material. Note that the hardness of the welded part 2 in the angular joint refers to, for example, a hardness as measured in a location 2a (see FIG. 10).

According to the laser-welded section shape steel 1 in accordance with Embodiment 2, the welded part 2 in each of the T-shaped joint and the angular joint has, as with Embodiment 1, an equivalent carbon content $C_{eql}$ of not less than 0.075 and not more than 0.15, the equivalent carbon content $C_{eql}$ being represented by Formula (1) above.

As has been discussed, the laser-welded section shape steel 1 in accordance with Embodiment 2 is configured such that the welded part 2 in the angular joint has, as with Embodiment 1, (a) an equivalent carbon content $C_{eql}$ of not less than 0.075 and not more than 0.15, the equivalent carbon content $C_{eql}$ being represented by Formula (1), (b) a protrusion length of not greater than 1 mm, and (c) a hardness of not less than 1.2 times and not more than 4 times as hard as that of the base material. With the configuration, the laser-welded section shape steel 1 in accordance with Embodiment 2 brings about the following effects (i) and (ii) as with Embodiment 1. (i) An increase in freedom is achieved in a case where a reinforcement member or the like is arranged in a region defined by the flange members 3 and the web member 4. (ii) The welded part 2 in each of the T-shaped joint and the angular joint is excellent in strength despite of having a protrusion length of not greater than 1 mm.

As has been discussed, a laser-welded section shape steel in accordance with an embodiment of the present invention includes: a web member and a flange member each made of a steel plate, the steel plate having an equivalent carbon content Ceql of not less than 0.075 and not more than 0.15, the equivalent carbon content Ceql being represented by following Formula (1):

$$C_{eql} = C + \frac{Si}{50} + \frac{Mn}{25} + \frac{P}{2} + \frac{Cr}{25} + Ti \quad (1)$$

a welded part, which is a joint part in which the web member and the flange member are joined, having a hardness of not less than 1.2 times and not more than 4 times as hard as that of the steel plate, the welded part having a protrusion length of not greater than 1 mm.

In the laser-welded section shape steel in accordance with an embodiment of the present invention, the web member can have a thickness of not greater than 6 mm.

In the laser-welded section shape steel in accordance with an embodiment of the present invention, the hardness of the welded part is preferably not less than 2 times and not more than 3.5 times as hard as that of the steel plate.

In the laser-welded section shape steel in accordance with an embodiment of the present invention, the protrusion length of the welded part is preferably not greater than 0.75 mm.

A method of producing a laser-welded section shape steel in accordance with an embodiment of the present invention is a method of producing a laser-welded section shape steel including a web member and a flange member each made of a steel plate, the method including the step of: joining the web member to the flange member by carrying out laser welding, the steel plate having an equivalent carbon content Ceql of not less than 0.075 and not more than 0.15, the equivalent carbon content Ceql being represented by following Formula (1):

$$C_{eql} = C + \frac{Si}{50} + \frac{Mn}{25} + \frac{P}{2} + \frac{Cr}{25} + Ti \quad (1)$$

a welded part, which is a joint part in which the web member and the flange member are joined, having a hardness of not less than 1.2 times and not more than 4 times as hard as that the steel plate, and the welded part having a protrusion length of not greater than 1 mm.

In the method of producing a laser-welded section shape steel in accordance with an embodiment of the present invention, the web member can have a thickness of not greater than 6 mm.

In the method of producing a laser-welded section shape steel in accordance with an embodiment of the present invention, the hardness of the welded part is preferably not less than 2 times and not more than 3.5 times as hard as that of the steel plate.

In the method of producing a laser-welded section shape steel in accordance with an embodiment of the present invention, the protrusion length of the welded part is preferably not greater than 0.75 mm.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

Example 1

The following description will more specifically discuss Embodiment 1 of the present invention with reference to Examples and Comparative Examples. The present invention is, however, not limited to those Examples.

An H-section shape steel, having a width of 100 mm and a height of 100 mm, was prepared (Examples 1 through 11 and Comparative Examples 1 through 12) by carrying out laser welding, with the use of a web member and flange members each having a corresponding equivalent carbon content $C_{eql}$ (see Table 1).

A steel plate, having a width of 100 mm and a length of 4 m, was employed as each of the flange members. A steel plate was employed as the web member. Such a steel plate had (i) a width of [100−total thickness of two flange members)/2] mm and (ii) a length of 4 m. Note that Table 1 shows thicknesses of used flange members and used web members.

Note that, in each of Examples 1 through 11 and Comparative Examples 1 through 12, a micro alloying steel plate was employed as each of the flange members and the web member.

Figure 3:
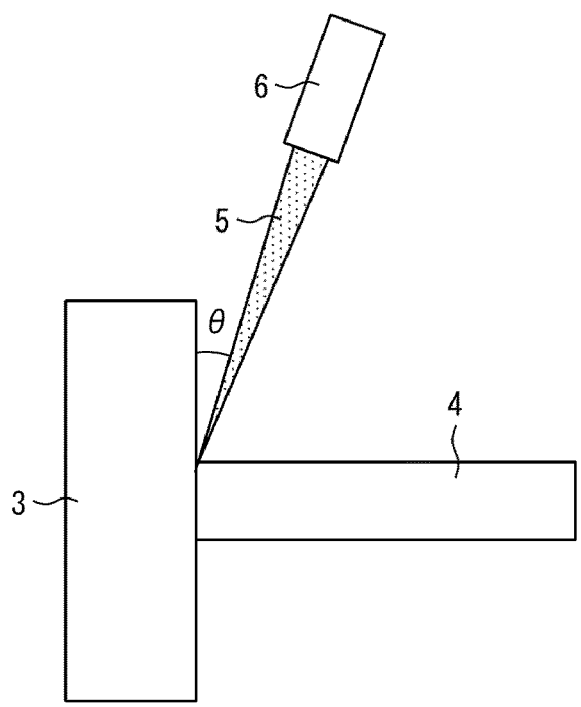
FIG. 3 is a view schematically illustrating how laser welding was carried out in Example 1 of the present invention.

FIG. 3 is a view schematically illustrating how laser welding was carried out in Example 1. As illustrated in FIG. 3, laser welding was carried out, with the use of a fiber laser welding machine, by (i) abutting the web member 4 against the flange members 3 and (ii), via a laser light torch 6, irradiating an abutting part with laser light 5 whose output power fell within the range of 4.0 kW to 5.2 kW and whose diameter was 0.6 mm. In so doing, (i) a welding speed was set to 4 m/min and (ii) an emission angle θ of the laser light 5 with respect to the flange members 3 was set to 10 degrees.

For comparison, (i) a lightweight welded H-section shape steel was prepared (Comparative Examples 13 and 14) by carrying out high-frequency welding and (ii) a rolled H-section shape steel was prepared (Comparative Examples 15 and 16) by carrying out hot rolling. Prior to each fatigue strength test, a web is cut away from a corresponding H-section shape steel so that T-section shape steel was obtained for the fatigue strength test. In Comparative Example 14, a bead which has been subjected to the high-frequency welding was removed, as a post treatment, by cutting. In Comparative Example 16, a fillet was removed, as a post treatment, by cutting.

TABLE 1

| | Production Method | Thickness (mm) | Strength of Base Material (N/mm²) | Surface Treatment | Post Treatment | Protrusion Length of Welded Part (mm) | $C_{eql}$ (Web Member) | $C_{eql}$ (Flange Member) |
|---|---|---|---|---|---|---|---|---|
| E 1 | Laser Welding | Web member: 2.3 | 400 | HCRP | None | 0.45 | | 0.084 |
| E 2 | | Flange member: 3.2 | 400 | Zinc Plating | | 0.50 | | 0.110 |
| E 3 | | | 400 | Acid Pickling Finish | | 0.30 | | 0.128 |
| E 4 | | | 400 | HCRP | | 0.40 | | 0.145 |
| E 5 | | | 400 | HCRP | | 0.45 | | 0.149 |
| E 6 | | | 400 | HCRP | | 0.35 | 0.145 | 0.128 |
| E 7 | | | 490 | HCRP | | 0.50 | | 0.099 |
| CE 1 | | | 400 | HCRP | | 0.30 | | 0.068 |
| CE 2 | | | 400 | HCRP | | 0.45 | | 0.159 |
| CE 3 | | | 400 | HCRP | | 0.55 | | 0.171 |
| CE 4 | | | 400 | Acid Pickling Finish | | 0.35 | 0.076 | 0.095 |
| CE 4.5 | | | 400 | HCRP | | 0.30 | | 0.147 |
| CE 5 | | | 490 | HCRP | | 0.45 | | 0.188 |
| E 8 | Laser Welding | Web member: 3.2 | 400 | HCRP | None | 0.50 | | 0.094 |
| CE 6 | | Flange member: 4.5 | 400 | HCRP | | 0.30 | | 0.060 |
| CE 7 | | | 400 | HCRP | | 0.40 | | 0.156 |
| E 9 | Laser Welding | Web member: 4.5 | 400 | HCRP | None | 0.45 | | 0.094 |
| CE 8 | | Flange member: 6.0 | 400 | HCRP | | 0.35 | | 0.049 |
| CE 9 | | | 400 | HCRP | | 0.30 | | 0.177 |
| E 10 | Laser Welding | Web member: 5.5 | 400 | None | None | 0.45 | | 0.097 |
| CE 10 | | Flange member: 8.0 | 400 | None | | 0.55 | | 0.054 |
| CE 11 | | | 400 | None | | 0.35 | | 0.178 |
| E 11 | Laser Welding | Web member: 8.0 | 400 | None | None | 0.75 | | 0.106 |
| CE 12 | | Flange member: 8.0 | 400 | None | | 1.25 | | 0.106 |
| CE 13 | High-Frequency Welding | Web member: 3.2 | 400 | None | None | 2.50 | | 0.131 |
| CE 14 | | Flange member: 4.5 | 400 | None | Bead Removal | 0.10 | | 0.131 |
| CE 15 | Hot Rolling | Web member: 5.5 | 400 | None | None | 6.00 | | 0.152 |
| CE 16 | | Flange member: 8.0 | 400 | None | Fillet Removal | 0.20 | | 0.152 |

*"E" stands for "Example".
"CE" stands for "Comparative Example".
"HCRP" stands for "Highly Corrosion Resistant Plating".

In regard to Examples 1 through 11 and Comparative Examples 1 through 16, a length (i.e., protrusion length) was measured by which a welded part protruded in a given cross section of the T-section shape steel, which cross section was perpendicular to a longitudinal direction of the laser-welded section shape steel 1. Table 1 shows measurement results of the protrusion lengths of the respective welded parts.

FIG. 8 is a view illustrating respective protrusion lengths in a lightweight welded section shape steel and a rolled section shape steel. (a) of FIG. 8 illustrates the lightweight welded section shape steel. (b) of FIG. 8 illustrates the rolled section shape steel.

Note that, in regard to a lightweight welded section shape steel (Comparative Examples 13 and 14) prepared by carrying out high-frequency welding, (i) lengths represented by α, β, γ, and δ in (a) of FIG. 8 were measured by which lengths beads protruded, from a web member and a flange member, in a given cross section of a T-section shape steel which cross section was perpendicular to the longitudinal direction of the T-section shape steel, and (ii) the greatest one of the lengths α, β, γ, and δ was regarded as the protrusion length. In regard to a rolled section shape steel (Comparative Examples 15 and 16) prepared by carrying out hot rolling, (i) lengths represented by α, β, γ, and δ in (b) of FIG. 8 were measured by which lengths fillets protruded, from a web member and a flange member, in a given cross section of a T-section shape steel which cross section was perpendicular to the longitudinal direction of the T-section shape steel, and (ii) the greatest one of the lengths α, β, γ, and δ was regarded as the protrusion length.

Table 1 shows that the protrusion length of the welded part was not greater than 1 mm in Examples 1 through 10 and Comparative Examples 1 through 11 each of which was prepared, by carrying out laser welding, with the use of a web member having a thickness of not greater than 6 mm. In contrast, the protrusion length of the welded part exceeded 1 mm in (i) Comparative Example 13 prepared by carrying out high-frequency welding and (ii) Comparative Example 15 prepared by carrying out hot rolling. Meanwhile, the protrusion length of the welded part was not greater than 1 mm in (i) Comparative Example 14 from which a bead was removed and (ii) Comparative Example 16 from which a fillet was removed.

Next, in regard to (i) Examples 1 through 11 and (ii) Comparative Examples 1 through 12 each of which was prepared by carrying out laser welding and (iii) Comparative Examples 13 and 14 each of which was prepared by carrying out high-frequency welding, each of the following hardness (a) and hardness (b) was measured so that the following hardness ratio (c) was calculated: (a) a hardness of the welded part, (b) a hardness of each of the flange members and the web member (i.e., a hardness of a base material), and (c) a hardness ratio which is represented by (hardness of welded part)/(hardness of base material). Table 2 shows measurement results of the hardness and the hardness ratio. Note that, in regard to Example 6 and Comparative Example 4 in each of which a corresponding web member differed in composition from corresponding flange members, an average of (i) the hardness of the flange members and (ii) the hardness of the web member was regarded as the hardness of the base material. In regard to Comparative Examples 15 and 16 each prepared by carrying out hot rolling, the hardness of the base material was measured because they had no welded part.

TABLE 2

| | Hardness of Base Material (Hv) | Hardness of Welded Part (Hv) | Hardness ratio |
|---|---|---|---|
| Example 1 | 128 | 375 | 2.9 |
| Example 2 | 131 | 389 | 3.0 |
| Example 3 | 133 | 401 | 3.0 |
| Example 4 | 130 | 407 | 3.1 |
| Example 5 | 127 | 432 | 3.4 |
| Example 6 | 132 | 396 | 3.0 |
| Example 7 | 138 | 386 | 2.8 |
| Comparative Example 1 | 132 | 362 | 2.7 |
| Comparative Example 2 | 128 | 413 | 3.2 |
| Comparative Example 3 | 127 | 421 | 3.3 |
| Comparative Example 4 | 117 | 476 | 4.1 |
| Comparative Example 4.5 | 117 | 134 | 1.1 |
| Comparative Example 5 | 145 | 414 | 2.9 |
| Example 8 | 129 | 374 | 2.9 |
| Comparative Example 6 | 126 | 358 | 2.8 |
| Comparative Example 7 | 131 | 423 | 3.2 |
| Example 9 | 128 | 358 | 2.8 |
| Comparative Example 8 | 124 | 308 | 2.5 |
| Comparative Example 9 | 130 | 409 | 3.2 |
| Example 10 | 127 | 380 | 3.0 |
| Comparative Example 10 | 128 | 352 | 2.8 |
| Comparative Example 11 | 127 | 417 | 3.3 |
| Example 11 | 136 | 393 | 2.9 |
| Comparative Example 12 | 132 | 390 | 3.0 |
| Comparative Example 13 | 142 | 383 | 2.7 |
| Comparative Example 14 | 142 | 383 | 2.7 |
| Comparative Example 15 | 145 | — | — |
| Comparative Example 16 | 145 | — | — |

The section shape steel of each of Examples 1 through 11 and Comparative Examples 1 through 16 was subjected to a fatigue test, a tensile test, and a diagonal cracking breakage test. How the respective tests were conducted is discussed below.

[Fatigue Test]

Figure 4:
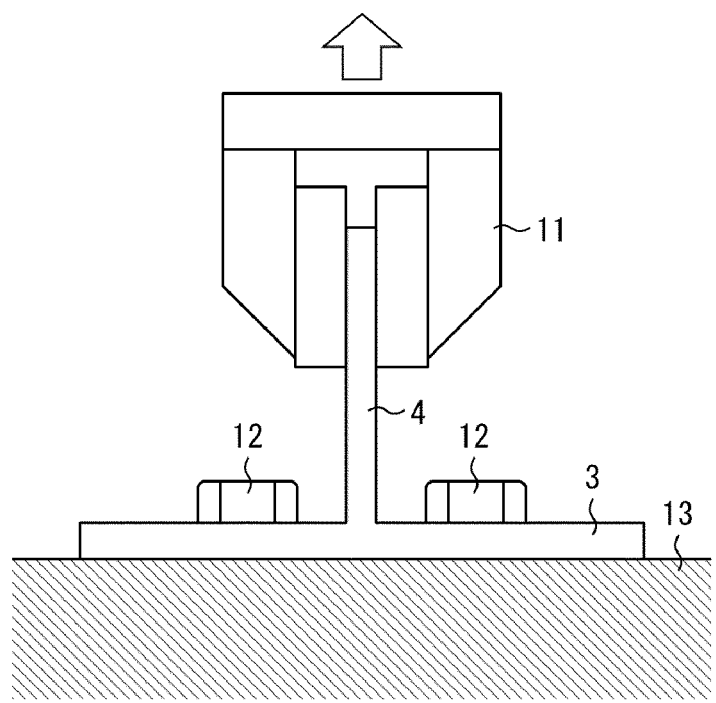
FIG. 4 is a view schematically illustrating a fatigue test in Example 1.

FIG. 4 is a view schematically illustrating a fatigue test. The flange member 3 was fixed, via fixation bolts 12, to a base 13 of a testing machine so that the flange member 3 was parallel to the base 13 (see FIG. 4). The test was then carried out under a complete pulsating, while causing (i) a chuck 11 to hold the web member 4 and (ii) a tension load to be applied to the web member 4 four times per second, which tension load corresponded to 10% to 80% of the strength of the base material. A load was measured under which no breakage occurred even after $10^6$ times of application of the load. A quotient, which was obtained by dividing the load thus measured by the strength of the base material, was defined as a fatigue limit. Furthermore, a load of 50% of the strength of the base material was repeatedly applied to the web member 4, and the number of times was counted by which the base material broke. Here, (i) a reference number of times is defined as the number of times by which the section shape steel of Comparative Example 15 broke after the load of 50% of a strength of the base material was repeatedly applied and (ii) a ratio of the number of times by which the base material broke to the reference number of times was defined as a fatigue lifetime. Table 3 shows the fatigue limit and the fatigue lifetime thus obtained. Table 3 also shows a location where the section shape steel broke during the fatigue test.

[Tensile Test]

The tensile test was run in conformity to JIS G 3353, and a location where the section shape steel broke was measured. Table 3 shows measurement results.

[Diagonal Cracking Test]

FIG. 5 is a view schematically illustrating a diagonal cracking test. First, the T-section shape steel was diagonally placed between a lower member 15 and a upper member 16 so that the flange member 3 and the web member 4 each made contact with the lower member 15 (see (a) of FIG. 5). A load was then applied to the upper member 16 so as to be directed toward the lower member 15, and the load was then kept being applied until the flange member 3 and the web member 4 were made perfectly contact with the upper member 16 and the lower member 15, respectively (see (b) of FIG. 5). Each measurement was then made as to whether cracking was caused in a corresponding welded part after the test. Table 3 shows results of the respective measurements.

Note that the following two ways of placing the laser-welded section shape steel are possible, i.e., (i) one way in which the laser-welded section shape steel is placed so that a side which was irradiated with laser light is located on an upper side and (ii) the other way in which the laser-welded section shape steel is placed so that the side which was irradiated with the laser light is located on a lower side. Note, however, that even in a case where the laser-welded section shape steel is placed so that the side which was irradiated with the laser light is located on either side, whether cracking is caused in the welded part does not change. As such, the ways of placing the laser-welded section shape steel is not limited to any particular way.

Note also that in regard to Comparative Examples 15 and 16 in each of which no welding was carried out, a measurement was made, after the diagonal cracking test, as to whether cracking was caused at a boundary between the web member and the flange member.

TABLE 3

| | Fatigue Limit | Fatigue Lifetime | Location of Breakage in Fatigue Test | Location of Breakage in Tensile Test for Welded Part | Diagonal Cracking Breakage Test |
|---|---|---|---|---|---|
| Example 1 | 0.40 | 1.02 | Web | Web Base Material | No Cracking |
| Example 2 | 0.40 | 0.93 | Web | Web Base Material | No Cracking |
| Example 3 | 0.45 | 0.98 | Web | Web Base Material | No Cracking |
| Example 4 | 0.40 | 1.06 | Web | Web Base Material | No Cracking |
| Example 5 | 0.35 | 0.98 | Web | Web Base Material | No Cracking |

TABLE 3-continued

| | Fatigue Limit | Fatigue Lifetime | Location of Breakage in Fatigue Test | Location of Breakage in Tensile Test for Welded Part | Diagonal Cracking Breakage Test |
|---|---|---|---|---|---|
| Example 6 | 0.45 | 1.00 | Web | Web Base Material | No Cracking |
| Example 7 | 0.40 | 0.95 | Web | Web Base Material | No Cracking |
| Comparative Example 1 | 0.25 | 0.92 | Welded Part | Welded Part | No Cracking |
| Comparative Example 2 | 0.30 | 0.87 | Welded Part | Web Base Material | No Cracking |
| Comparative Example 3 | 0.25 | 0.76 | Welded Part | Web Base Material | Cracking Caused |
| Comparative Example 4 | 0.35 | 0.96 | Welded Part | Web Base Material | Cracking Caused |
| Comparative Example 4.5 | 0.25 | 0.95 | Welded Part | Welded Part | No Cracking |
| Comparative Example 5 | 0.25 | 0.45 | Welded Part | Welded Part | Cracking Caused |
| Example 8 | 0.45 | 0.98 | Web | Web Base Material | No Cracking |
| Comparative Example 6 | 0.30 | 0.84 | Welded Part | Web Base Material | No Cracking |
| Comparative Example 7 | 0.25 | 0.72 | Welded Part | Web Base Material | No Cracking |
| Example 9 | 0.45 | 1.05 | Web | Web Base Material | No Cracking |
| Comparative Example 8 | 0.30 | 0.75 | Welded Part | Welded Part | No Cracking |
| Comparative Example 9 | 0.25 | 0.65 | Welded Part | Web Base Material | Cracking Caused |
| Example 10 | — | 0.96 | Web | Web Base Material | No Cracking |
| Comparative Example 10 | 0.30 | 0.64 | Welded Part | Web Base Material | No Cracking |
| Comparative Example 11 | 0.30 | 0.71 | Welded Part | Web Base Material | Cracking Caused |
| Example 11 | 0.40 | 0.94 | Web | Web Base Material | No Cracking |
| Comparative Example 12 | 0.30 | 0.70 | Welded Part | Web Base Material | Cracking Caused |
| Comparative Example 13 | 0.25 | 0.82 | Welded Part | Web Base Material | Cracking Caused |
| Comparative Example 14 | 0.20 | 0.62 | Welded Part | Welded Part | Cracking Caused |
| Comparative Example 15 | 0.40 | 1.00 | Web | Center of Web | No Cracking |
| Comparative Example 16 | 0.25 | 0.88 | Boundary Between Web and Flange | Boundary Between Web and Flange | Cracking Caused |

Tables 1 through 3 show that, in each of Comparative Examples 1, 6, 8, and 10 whose equivalent carbon content $C_{eql}$ was less than 0.075, a corresponding welded part (i) broke during the fatigue test and (ii) was easy to break during the tensile test. Tables 1 through 3 further show that, in each of Comparative Examples 2, 3, 5, 7, 9, and 11 whose equivalent carbon content $C_{eql}$ was not less than 0.15, (i) a corresponding welded part broke during the fatigue test and (ii) cracking was easy to be caused during the diagonal cracking test. From the above test results, it was confirmed that the equivalent carbon content $C_{eql}$ needs to be not less than 0.075 and not more than 0.15.

According to Comparative Example 4 in which the hardness ratio exceeded 4, (i) the welded part broke during the fatigue test and (ii) cracking was caused during the diagonal cracking test. From the test results, it was confirmed that the hardness ratio needs to be not more than 4. Comparative Example 4 and 5, in each of which the hardness ratio was less than 1.2, showed that the welded part broke during both of the fatigue test and the tensile test. From the test results, it was confirmed that the hardness ratio is preferably not less than 1.2.

It was also confirmed that it is possible to achieve a laser-welded section shape steel which (i) causes no breakage in a welded part during the tensile test, (ii) causes no cracking in the welded part during the diagonal cracking test, and (iii) is excellent in terms of fatigue lifetime, by (a) causing the equivalent carbon content $C_{eql}$ to be not less than 0.075 and not more than 0.15 and (b) causing the hardness of the welded part to be not less than 1.2 times and not more than 4 times as hard as that of the base material.

The protrusion length was longer in Example 11 in which the thickness of the web member exceeded 6 mm than in Examples 1 through 10 in each of which the thickness of the web member was not greater than 6 mm. This confirmed that the thickness of the web member is preferably not greater than 6 mm.

Example 2

Next, the following description will discuss Examples and Comparative Examples of the J-section shape steel in accordance with Embodiment 2 of the present invention. A J-section shape steel, having a width of 100 mm and a height of 100 mm, was prepared (Examples 12 through 22 and Comparative Examples 17 through 28) by carrying out laser welding, with the use of a web member and flange members each having a corresponding equivalent carbon content $C_{eql}$ (see Table 4).

A steel plate, having a width of 100 mm and a length of 4 m, was employed as the flange member 3a. A steel plate was employed as the flange member 3b. Such a steel plate had (i) a width of [50α(thickness of web member 4)/2] mm and (ii) a length of 4 m. A steel plate was employed as the web member 4. Such a steel plate had (i) a width of [100−(thickness of flange member 3*a*+thickness of flange member 3*b*)/2] mm and (ii) a length of 4 m. Table 4 shows respective thicknesses of used flange members and used web member.

Note that, in each of Examples 12 through 22 and Comparative Examples 17 through 28, a micro alloying steel plate was employed as each of the flange members and the web member.

As illustrated in FIG. 12, laser welding was carried out, with the use of a fiber laser welding machine, by (i) abutting the web member 4 against the flange members 3*a* and 3*b* and (ii) irradiating the web member 4 and the flange members 3*a* and 3*b* with laser light whose output power fell within the range of 4.0 kW to 5.2 kW and whose diameter was 0.6 mm. In so doing, (i) a welding speed was set to 4 m/min, and (ii) an emission angle θ of the laser light with respect to the flange members 3*a* and 3*b* was set to 10 degrees.

For comparison, a sample having a shape equivalent to that of an angular joint was prepared. Such a sample was obtained by removing a flange member, by cutting, from each of (i) a lightweight welded H-section shape steel (Comparative Examples 29 and 30) prepared by carrying out high-frequency welding and (ii) a rolled H-section shape steel (Comparative Examples 31 and 32) prepared by carrying out hot rolling.

Prior to the test, the section shape steel was cut at the center of the web member 4 so that an L-section shape steel having an angular joint was obtained for the test. In Comparative Example 30, a bead which has been subjected to the high-frequency welding was removed by cutting. In Comparative Example 32, a fillet of the rolled section shape steel was removed by cutting.

TABLE 4

| | Production Method | Thickness (mm) | Strength of Base Material (N/mm²) | Surface Treatment | Post Treatment | Protrusion Length of Welded Part (mm) | $C_{eql}$ (Web Member) | $C_{eql}$ (Flange Member) |
|---|---|---|---|---|---|---|---|---|
| E 12 | Laser Welding | Web member: 2.3 | 400 | HCRP | None | 0.45 | 0.084 | |
| E 13 | | Flange member: 3.2 | 400 | Zinc Plating | | 0.40 | 0.110 | |
| E 14 | | | 400 | Acid Pickling Finish | | 0.35 | 0.128 | |
| E 15 | | | 400 | HCRP | | 0.40 | 0.145 | |
| E 16 | | | 400 | HCRP | | 0.50 | 0.149 | |
| E 17 | | | 400 | HCRP | | 0.40 | 0.145 | 0.128 |
| E 18 | | | 490 | HCRP | | 0.45 | 0.099 | |
| CE 17 | | | 400 | HCRP | | 0.35 | 0.068 | |
| CE 18 | | | 400 | HCRP | | 0.40 | 0.159 | |
| CE 19 | | | 400 | HCRP | | 0.50 | 0.171 | |
| CE 20 | | | 400 | Acid Pickling Finish | | 0.40 | 0.076 | 0.095 |
| CE 20.5 | | | 400 | HCRP | | 0.25 | 0.147 | |
| CE 21 | | | 490 | HCRP | | 0.50 | 0.188 | |
| E 19 | Laser Welding | Web member: 3.2 | 400 | HCRP | None | 0.45 | 0.094 | |
| CE 22 | | Flange member: 4.5 | 400 | HCRP | | 0.35 | 0.060 | |
| CE 23 | | | 400 | HCRP | | 0.35 | 0.156 | |
| E 20 | Laser Welding | Web member: 4.5 | 400 | HCRP | None | 0.45 | 0.094 | |
| CE 24 | | Flange member: 6.0 | 400 | HCRP | | 0.40 | 0.049 | |
| CE 25 | | | 400 | HCRP | | 0.35 | 0.177 | |
| E 21 | Laser Welding | Web member: 5.5 | 400 | None | None | 0.40 | 0.097 | |
| CE 26 | | Flange member: 8.0 | 400 | None | | 0.50 | 0.054 | |
| CE 27 | | | 400 | None | | 0.40 | 0.178 | |
| E 22 | Laser Welding | Web member: 8.0 | 400 | None | None | 0.70 | 0.106 | |
| CE 28 | | Flange member: 8.0 | 400 | None | | 1.20 | 0.106 | |
| CE 29 | High-Frequency Welding | Web member: 3.2 | 400 | None | None | 3.00 | 0.131 | |
| CE 30 | | Flange member: 4.5 | 400 | None | Bead Removal | 0.10 | 0.131 | |
| CE 31 | Hot Rolling | Web member: 5.5 | 400 | None | None | 6.00 | 0.152 | |
| CE 32 | | Flange member: 8.0 | 400 | None | Fillet Removal | 0.20 | 0.152 | |

*"E" stands for "Example".
"CE" stands for "Comparative Example".
"HCRP" stands for "Highly Corrosion Resistant Plating".

In regard to Examples 12 through 22 and Comparative Examples 17 through 28, a length (i.e., protrusion length) was measured by which a welded part in an angular joint protruded in a given cross section of the L-section shape steel, which cross section was perpendicular to a longitudinal direction of the L-section shape steel. Table 4 shows measurement results of the protrusion lengths of the respective welded parts.

Table 4 shows that the protrusion length of the welded part was not greater than 1 mm in Examples 12 through 22 and Comparative Examples 17 through 27 each of which was prepared, by carrying out laser welding, with the use of a web member having a thickness of not greater than 6 mm. In contrast, the protrusion length of the welded part exceeded 1 mm in (i) Comparative Example 29 prepared by carrying out high-frequency welding and (ii) Comparative Example 31 prepared by carrying out hot rolling. Meanwhile, the protrusion length of the welded part was not greater than 1 mm in (i) Comparative Example 29 from which a bead was removed and (ii) Comparative Example 31 from which a fillet was removed.

Next, in regard to (i) Examples 12 through 22 and (ii) Comparative Examples 17 through 28 each of which was prepared by carrying out laser welding and (iii) Comparative Examples 29 and 30 each of which was prepared by carrying out high-frequency welding, each of the following hardness (a) and hardness (b) was measured so that the following hardness ratio (c) was calculated: (a) a hardness of the welded part in the angular joint, (b) a hardness of each of the flange members and the web member (i.e., a hardness of a base material), and (c) a hardness ratio which is represented by (hardness of welded part)/(hardness of base material). Table 5 shows measurement results of the hardness and the hardness ratio. Note that, in regard to Example 17 and Comparative Example 20 in each of which a corresponding web member differed in composition from corresponding flange members, an average of (i) the hardness of the flange members and (ii) the hardness of the web member was regarded as the hardness of the base material. In regard to Comparative Examples 31 and 32 each prepared by carrying out hot rolling, the hardness of the base material was measured because they had no welded part.

TABLE 5

| | Hardness of Base Material (Hv) | Hardness of Welded Part (Hv) | Hardness ratio |
|---|---|---|---|
| Example 12 | 128 | 372 | 2.9 |
| Example 13 | 131 | 389 | 3.0 |
| Example 14 | 133 | 403 | 3.0 |
| Example 15 | 130 | 402 | 3.1 |
| Example 16 | 127 | 421 | 3.3 |
| Example 17 | 132 | 398 | 3.0 |
| Example 18 | 138 | 392 | 2.8 |
| Comparative Example 17 | 132 | 375 | 2.8 |
| Comparative Example 18 | 128 | 415 | 3.2 |
| Comparative Example 19 | 127 | 425 | 3.3 |
| Comparative Example 20 | 117 | 480 | 4.1 |
| Comparative Example 20.5 | 117 | 132 | 1.1 |
| Comparative Example 21 | 145 | 421 | 2.9 |
| Example 19 | 129 | 385 | 3.0 |
| Comparative Example 22 | 126 | 365 | 2.9 |
| Comparative Example 23 | 131 | 425 | 3.2 |
| Example 20 | 128 | 362 | 2.8 |
| Comparative Example 24 | 124 | 302 | 2.4 |
| Comparative Example 25 | 130 | 414 | 3.2 |
| Example 21 | 127 | 384 | 3.0 |
| Comparative Example 26 | 128 | 346 | 2.7 |
| Comparative Example 27 | 127 | 425 | 3.3 |
| Example 22 | 136 | 395 | 2.9 |
| Comparative Example 28 | 132 | 393 | 3.0 |
| Comparative Example 29 | 142 | 383 | 2.7 |
| Comparative Example 30 | 142 | 383 | 2.7 |
| Comparative Example 31 | 145 | — | — |
| Comparative Example 32 | 145 | — | — |

The L-section shape steel, having an angular joint, of each of Examples 12 through 22 and Comparative Examples 17 through 28 was subjected to a fatigue test, a tensile test, and an adhesion bending test. How the respective tests were conducted is discussed below.

[Fatigue Test]

FIG. 13 is a view schematically illustrating the fatigue test. The flange member 3b was fixed, via fixation bolts 12, to a base 13 of a testing machine so that the flange member 3b was parallel to the base 13 (see FIG. 13). The test was then carried out under a complete pulsating, while causing (i) a chuck 11 to hold the web member 4 and (ii) a tension load to be applied to the web member 4 four times per second, which tension load corresponded to 10% to 80% of the strength of the base material. A load was measured under which no breakage occurred even after $10^6$ times of application of the load. A quotient, which was obtained by dividing the load thus measured by the strength of the base material, was defined as a fatigue limit. Furthermore, a load of 50% of the strength of the base material was repeatedly applied to the web member 4, and the number of times was counted by which the base material broke. Here, (i) a reference number of times is defined as the number of times by which the section shape steel of Comparative Example 31 broke after the load of 50% of the strength of the base material was repeatedly applied and (ii) a ratio of the number of times by which the base material broke to the reference number of times was defined as a fatigue lifetime. Table 6 shows the fatigue limit and the fatigue lifetime thus obtained. Table 6 also shows a location where the section shape steel broke during the fatigue test.

[Tensile Test]

The tensile test was run in conformity to JIS G 3353, and a location where the section shape steel broke was measured. Table 6 shows measurement results.

[Adhesion Bending Test]

FIG. 14 is a view schematically illustrating the adhesion bending test. First, the L-section shape steel was diagonally placed between a lower member 15 and a upper member 16 so that (i) an end of the flange member 3b made contact with the lower member 15 and (ii) an end of the web member 4 made contact with the upper member 16 (see (a) of FIG. 14). A load was then applied to the upper member 16 so as to be directed toward the lower member 15 so that the shape section steel was deformed (see (b) of FIG. 14), and the load was then kept being applied until the flange member 3b and the web member 4 made perfectly contact with the lower member 15 and the upper member 16, respectively (see (c) of FIG. 14). Each measurement was then made as to whether cracking was caused in a corresponding welded part after the test. Table 6 shows results of the respective measurements.

In regard to Comparative Examples 31 and 32 in each of which no welding was carried out, a measurement was made, after the adhesion bending test, as to whether cracking was caused at a boundary between the web member and the flange member.

TABLE 6

| | Fatigue Limit | Fatigue Lifetime | Location of Breakage in Fatigue Test | Location of Breakage in Tensile Test for Welded Part | Adhesion Bending Test for Welded Part in Angular Joint |
|---|---|---|---|---|---|
| Example 12 | 0.40 | 1.05 | Web | Web Base Material | No Cracking |
| Example 13 | 0.45 | 1.01 | Web | Web Base Material | No Cracking |
| Example 14 | 0.40 | 0.97 | Web | Web Base Material | No Cracking |

TABLE 6-continued

|  | Fatigue Limit | Fatigue Lifetime | Location of Breakage in Fatigue Test | Location of Breakage in Tensile Test for Welded Part | Adhesion Bending Test for Welded Part in Angular Joint |
|---|---|---|---|---|---|
| Example 15 | 0.45 | 1.02 | Web | Web Base Material | No Cracking |
| Example 16 | 0.40 | 0.96 | Web | Web Base Material | No Cracking |
| Example 17 | 0.45 | 1.01 | Web | Web Base Material | No Cracking |
| Example 18 | 0.40 | 0.98 | Web | Web Base Material | No Cracking |
| Comparative Example 17 | 0.20 | 0.94 | Welded Part | Welded Part | No Cracking |
| Comparative Example 18 | 0.30 | 0.85 | Welded Part | Web Base Material | No Cracking |
| Comparative Example 19 | 0.30 | 0.78 | Welded Part | Web Base Material | Cracking Caused |
| Comparative Example 20 | 0.30 | 0.89 | Welded Part | Web Base Material | Cracking Caused |
| Comparative Example 20.5 | 0.20 | 0.92 | Welded Part | Welded Part | No Cracking |
| Comparative Example 21 | 0.25 | 0.58 | Welded Part | Welded Part | Cracking Caused |
| Example 19 | 0.45 | 1.04 | Web | Web Base Material | No Cracking |
| Comparative Example 22 | 0.30 | 0.78 | Welded Part | Web Base Material | No Cracking |
| Comparative Example 23 | 0.25 | 0.82 | Welded Part | Web Base Material | No Cracking |
| Example 20 | 0.45 | 1.01 | Web | Web Base Material | No Cracking |
| Comparative Example 24 | 0.25 | 0.79 | Welded Part | Welded Section | No Cracking |
| Comparative Example 25 | 0.30 | 0.71 | Welded Part | Web Base Material | Cracking Caused |
| Example 21 | 0.40 | 1.02 | Web | Web Base Material | No Cracking |
| Comparative Example 26 | 0.25 | 0.75 | Welded Part | Web Base Material | No Cracking |
| Comparative Example 27 | 0.30 | 0.68 | Welded Part | Web Base Material | Cracking Caused |
| Example 22 | 0.40 | 0.95 | Web | Web Base Material | No Cracking |
| Comparative Example 28 | 0.25 | 0.72 | Welded Part | Web Base Material | Cracking Caused |
| Comparative Example 29 | 0.25 | 0.79 | Welded Part | Web Base Material | Cracking Caused |
| Comparative Example 30 | 0.20 | 0.74 | Welded Part | Welded Section | Cracking Caused |
| Comparative Example 31 | 0.40 | 1.00 | Web | Center of Web | No Cracking |
| Comparative Example 32 | 0.20 | 0.78 | Boundary Between Web and Flange | Boundary Between Web and Flange | Cracking Caused |

Tables 4 through 6 show that, in each of Comparative Examples 17, 22, 24, and 26 whose equivalent carbon content $C_{eql}$ was less than 0.075, a corresponding welded part (i) broke during the fatigue test and (ii) was easy to break during the tensile test. Tables 4 through 6 further show that, in each of Comparative Examples 18, 19, 21, 23, 25, and 27 whose equivalent carbon content $C_{eql}$ was not less than 0.15, (i) a corresponding welded part broke during the fatigue test and (ii) cracking was easy to be caused during the adhesion bending test. From the above test results, it was confirmed that the equivalent carbon content $C_{eql}$ needs to be not less than 0.075 and not more than 0.15.

According to Comparative Example 20 in which the hardness ratio exceeded 4, (i) the welded part broke during the fatigue test and (ii) cracking was caused during the diagonal cracking test. From the test results, it was confirmed that the hardness ratio needs to be not more than 4. Comparative Example 20.5, in which the hardness ratio was less than 1.2, showed that the welded part broke during both of the fatigue test and the tensile test. From the test results, it was confirmed that the hardness ratio is preferably not less than 1.2.

It was also confirmed that it is possible to achieve a laser-welded section shape steel which (i) causes no breakage in a welded part during the tensile test, (ii) causes no cracking in the welded part during the diagonal cracking test, and (iii) is excellent in terms of fatigue lifetime, by (a) causing the equivalent carbon content $C_{eql}$ to be not less than 0.075 and not more than 0.15 and (b) causing the hardness of the welded part to be not less than 1.2 times and not more than 4 times as hard as that of the base material.

The protrusion length was longer in Example 22 in which the thickness of the web member exceeded 6 mm than in Examples 12 through 21 in each of which the thickness of the web member was not greater than 6 mm. This confirmed that the thickness of the web member is preferably not greater than 6 mm.

REFERENCE SIGNS LIST

1: Laser-welded shape section steel
2: Welded part
3: Flange member
4: Web member

The invention claimed is:
1. A laser-welded section shape steel, comprising:
a web member and a flange member each made of a steel plate,
the laser-welded section shape steel satisfying the following conditions (a) and (b):
(a) the steel plate of the web member and the steel plate of the flange member each having an equivalent carbon content $C_{eql}$ of not less than 0.075 and not more than 0.15, the equivalent carbon content $C_{eql}$ being represented by following Formula (1) in which each element represents a weight percentage:

$$C_{eql} = C + \frac{Si}{50} + \frac{Mn}{25} + \frac{P}{2} + \frac{Cr}{25} + Ti; \quad (1)$$

and
(b) a welded part, which is a joint part in which the web member and the flange member are joined, having a hardness of not less than 2.8 times and not more than 4 times as hard as an average hardness of the steel plate of the web member and of the steel plate of the flange member,
lengths α, β, γ, and δ being not greater than 1 mm, where (i) a side of the web member, which side has been irradiated with laser light, is referred to as a front side, (ii) the welded part protrudes, by the length α, from the flange member on the front side of the web member, (iii) the welded part protrudes, by the length γ, from the front side of the web member, (iv) the welded part protrudes, by the length β, from the flange member on a back side of the web member, and (v) the welded part protrudes, by the length δ, from the back side of the web member.

2. The laser-welded section shape steel as set forth in claim 1, wherein:
the web member has a thickness of not greater than 6 mm.

3. A method of producing a laser-welded section shape steel including a web member and a flange member each made of a steel plate, the method comprising the step of: joining the web member to the flange member by carrying out laser welding,
the laser-welded section shape steel satisfying the following conditions (a) and (b):
(a) the steel plate of the web member and the steel plate of the flange member each having an equivalent carbon content $C_{eql}$ of not less than 0.075 and not more than 0.15, the equivalent carbon content $C_{eql}$ being represented by following Formula (1) in which each element represents a weight percentage:

$$C_{eql} = C + \frac{Si}{50} + \frac{Mn}{25} + \frac{P}{2} + \frac{Cr}{25} + Ti; \quad (1)$$

and
(b) a welded part, which is a joint part in which the web member and the flange member are joined, having a hardness of not less than 2.8 times and not more than 4 times as hard as an average hardness of the steel plate of the web member and of the steel plate of the flange member, and
lengths α, β, γ, and δ being not greater than 1 mm, where (i) a side of the web member, which side has been irradiated with laser light, is referred to as a front side, (ii) the welded part protrudes, by the length α, from the flange member on the front side of the web member, (iii) the welded part protrudes, by the length γ, from the front side of the web member, (iv) the welded part protrudes, by the length β, from the flange member on a back side of the web member, and (v) the welded part protrudes, by the length δ, from the back side of the web member.

* * * * *